C. L. WHALEY.
CLUTCH MECHANISM.
APPLICATION FILED DEC. 14, 1907.

919,101.

Patented Apr. 20, 1909.
2 SHEETS—SHEET 1.

Witnesses
C. E. Smith.
P. M. Smith.

Inventor
Christopher L. Whaley.
By Victor J. Evans.
Attorney

C. L. WHALEY.
CLUTCH MECHANISM.
APPLICATION FILED DEC. 14, 1907.

919,101.

Patented Apr. 20, 1909.
2 SHEETS—SHEET 2.

Inventor
Christopher L. Whaley.

Witnesses
C. E. Smith.
P. M. Smith.

By Victor J. Evans
Attorney

UNITED STATES PATENT OFFICE.

CHRISTOPHER L. WHALEY, OF AUGUSTA, GEORGIA.

CLUTCH MECHANISM.

No. 919,101.　　　　Specification of Letters Patent.　　　Patented April 20, 1909.

Application filed December 14, 1907.　Serial No. 406,537.

*To all whom it may concern:*

Be it known that I, CHRISTOPHER L. WHALEY, a citizen of the United States, residing at Augusta, in the county of Richmond and State of Georgia, have invented new and useful Improvements in Clutch Mechanism, of which the following is a specification.

This invention relates to changeable speed gear, the object of the invention being to provide gearing of the character referred to which, while particularly designed for use in connection with automobiles and the like is also adapted for use in connection with any piece of mechanism wherein it is necessary or desirable to effect a change of speed between the driving and the driven shaft.

With the above general object in view, the invention consists in the novel construction, combination and arrangement of parts herein fully described, illustrated and claimed.

Figure 1:
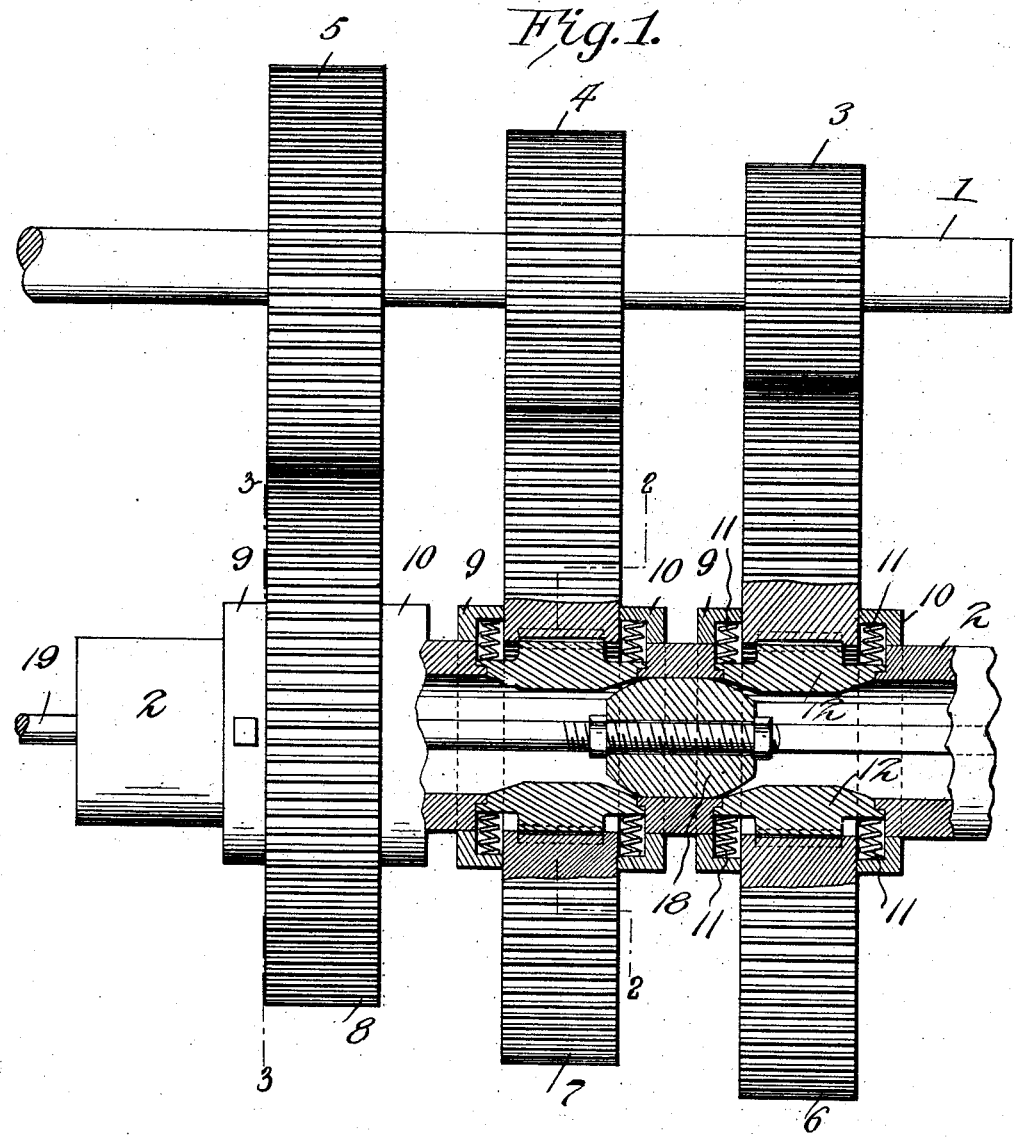
Figure 2:
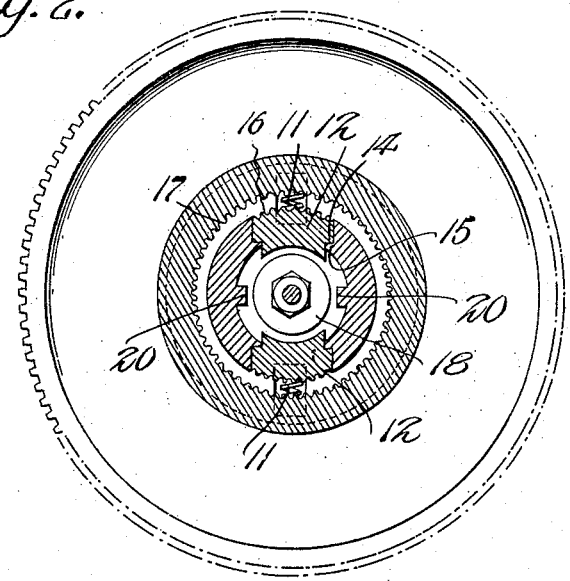
Figure 3:
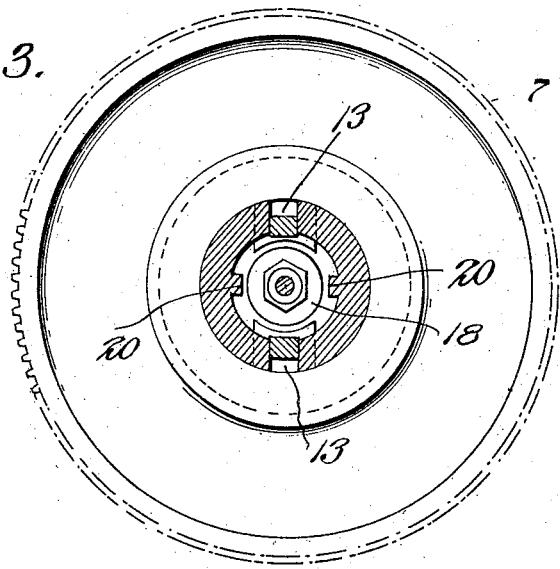

In the accompanying drawings:—Figure 1 is a sectional plan view of changeable speed gearing constructed in accordance with the present invention. Fig. 2 is a cross section on the line 2—2 of Fig. 1. Fig. 3 is a cross section on the line 3—3 of Fig. 1.

Referring to the drawings, 1 designates the driving shaft which may be the shaft of an engine of any description.

2 designates the shaft to be driven.

In carrying out the present invention, the shaft 1 is provided with spur gear wheels 3, 4 and 5 of different sizes, the said gear wheels, being fast on the shaft 1.

The shaft 2 is hollow or tubular in construction and has mounted thereon a series of gear wheels 6, 7 and 8 which line up with the wheels 3, 4 and 5 and constantly mesh therewith as shown in Fig. 1. Each of the wheels 6, 7 and 8 is held in position on the shaft 2 between a pair of oppositely arranged collars 9 and 10 each of said collars being hollowed out on its inner side at opposite places to contain springs 11 which exert an inward pressure on the oppositely projecting end portions of a pair of oppositely located clutch dogs 12. Where the dogs 12 are located, the shaft is provided with slots 13 which receive portions of the dogs and allow said dogs to move inward and outward radially as indicated in Figs. 2 and 3. Each of said dogs is shouldered as shown at 14 and the shaft 2 is correspondingly rabbeted, as shown at 15 whereby the inward movement of the dogs is limited and yet they are permitted to move outward radially. The outer surface of the dogs are toothed or serrated as shown at 16 while the inner bore of the hub of each of the gears 6 is also toothed or serrated as seen at 17. Therefore, when the dogs 12 are pressed outward, they engage and interlock with the inner surface of the adjacent gear wheel 6, 7 or 8 thereby locking said gear wheel to the shaft 2.

The forcing outward of the dogs 12 is effected by means of a sliding expander 18 which is movable lengthwise of the bore of the shaft 2 and is actuated by means of a slide rod 19 which extends lengthwise of the hollow shaft 2, as shown in Fig. 1. The expander 18 is in the form of a cylinder having its ends chamfered or beveled to form wedge-shaped faces which operate against the correspondingly inclined end portions of the dogs 12 so that when said expander is moved lengthwise of the shaft 2, it acts on the oppositely located dogs 12 forcing the latter outward into engagement with the particular gear wheel 6, 7 or 8 with which they are associated. When the expander is moved out of engagement with the dogs, the latter are pressed inward by the springs 11 and the wheel is then loose on the shaft 2.

From the foregoing description, it will be understood that the wheels 6, 7 and 8 are always in mesh with the wheels 3, 4 and 5; furthermore, that the wheels 6, 7 and 8 are all loose on the shaft 2 but are adapted to be locked to said shaft individually and one at a time by shifting the expander 18 in the manner above described. It will also be understood that the gears are of the variable speed type and that their relative size may be varied to give any desired speed.

The expander 18 has a tongue-and-groove engagement with the hollow shaft 2 as shown in Figs. 2 and 3 in which it will be observed that said expander is provided with grooves at diametrically opposite points which receive keys or tongues 20 projecting inward from the inner surface of the hollow shaft 2.

Having thus described the invention, what is claimed as new, is:—

In changeable speed mechanism, a clutch for locking a wheel to a shaft comprising oppositely arranged locking dogs carried by the shaft and movable into and out of engagement with the wheel, recessed collars at opposite sides of the wheel, springs housed in said collars and acting with an inward pressure on the dogs, and an expander movable lengthwise of the shaft and adapted to engage said dogs and force them into engagement with the wheel.

In testimony whereof I affix my signature in presence of two witnesses.

CHRISTOPHER L. WHALEY.

Witnesses:
JOHN M. CLARK,
G. LLOYD PREACHER.